United States Patent
Dixon et al.

(10) Patent No.: US 8,968,442 B2
(45) Date of Patent: Mar. 3, 2015

(54) LEACHING PROCESS FOR COPPER CONCENTRATES WITH A CARBON CATALYST

(75) Inventors: David G. Dixon, Delta (CA); Berny Rivera-Vasquez, Samegua (PE)

(73) Assignee: The University of British Columbia, Vancouver (CA)

( * ) Notice: Subject to any disclaimer, the term of this patent is extended or adjusted under 35 U.S.C. 154(b) by 332 days.

(21) Appl. No.: 13/503,338

(22) PCT Filed: Oct. 20, 2010

(86) PCT No.: PCT/CA2010/001668
§ 371 (c)(1),
(2), (4) Date: Jul. 24, 2012

(87) PCT Pub. No.: WO2011/047477
PCT Pub. Date: Apr. 28, 2011

(65) Prior Publication Data
US 2012/0279357 A1    Nov. 8, 2012

Related U.S. Application Data

(60) Provisional application No. 61/272,682, filed on Oct. 21, 2009.

(51) Int. Cl.
C22B 15/00 (2006.01)
C25C 1/12 (2006.01)
C22B 3/24 (2006.01)

(52) U.S. Cl.
CPC .............. *C22B 15/0071* (2013.01); *C22B 3/24* (2013.01); *C22B 15/0086* (2013.01); *C22B 15/0089* (2013.01)
USPC ........................................... 75/743; 205/772

(58) Field of Classification Search
USPC ............................................. 75/743; 205/772
See application file for complete search history.

(56) References Cited

U.S. PATENT DOCUMENTS 3,390,969 A † 7/1968 Chen
3,865,744 A * 2/1975 Parker et al. .................... 75/373

(Continued)

FOREIGN PATENT DOCUMENTS

JP    2005-15864    † 1/2005
JP    2007-204830   † 8/2007

(Continued)

OTHER PUBLICATIONS

"Particle Size Conversion Table." Sigma-Aldrich. N.p., n.d. Web. Jul. 18, 2014. <http://www.sigmaaldrich.com/chemistry/stockroom-reagents/learning-center/technical-library/particle-size-conversion.html>.*

(Continued)

*Primary Examiner* — George Wyszomierski
*Assistant Examiner* — Tima M McGuthry Banks
(74) *Attorney, Agent, or Firm* — Kilpatrick Townsend & Stockton LLP

(57) ABSTRACT

A method of recovering copper from a copper sulfide concentrate comprising a copper arsenic sulfosalt or a copper antimony sulfosalt, using carbon as a catalyst. The concentrate and carbon are added to an acidic sulfate leach solution. The copper is leached from the concentrate, in the presence of an oxygen-containing gas. The operating potential is maintained above a selected level. The carbon copper sulfide ratio of the carbon being added to the copper sulfide present in the concentrate being added is at least 1:20. The carbon may be maintained above a selected concentration in the leach solution. The leached copper is recovered from the solution by conventional methods.

42 Claims, 8 Drawing Sheets

(56) References Cited

U.S. PATENT DOCUMENTS

| | | | |
|---|---|---|---|
| 3,930,969 A | | 1/1976 | Chen |
| 4,483,827 A | * | 11/1984 | Heimala ..................... 423/28 |
| 5,730,776 A | * | 3/1998 | Collins et al. ................ 75/728 |
| 5,993,635 A | † | 11/1999 | Hourn et al. |
| 6,319,389 B1 | † | 11/2001 | Fountain et al. |
| 8,277,539 B2 | * | 10/2012 | Dixon et al. .................. 75/743 |

FOREIGN PATENT DOCUMENTS

| | | |
|---|---|---|
| WO | 96/27030 A1 | 6/1996 |
| WO | 2009/135291 A1 | 12/2009 |

OTHER PUBLICATIONS

Dreisinger, D., "The Hydrometallurgical Treatment of Arsenical Copper Concentrates: New Process Options to Unlock Metal Values and Fix Aresnic in Waste," (2005), pp. 1-29, University of British Columbia, Vancouver, B.C., Canada.

Nadkarni, R.M., et al., "Hydrometallurgical Removal of Arsenic from Copper Concentrates," Arsenic Metallurgy Fundamentals and Applications; proc. of symposium, (Jan. 1988), pp. 263-286, Phoenix, Arizona.

Tshilombo, A.F., et al.. "Kinetic Study of Chalcopyrite Passivation During Electrochemical and Chemical Leaching," (2003), Electrochemical Society Proceedings vol. 2003-18, pp. 108-119, University of British Columbia, Vancouver, B.C., Canada.

Yuehua, H., et al., "The effect of silver bearing catalysts on bioleaching of chalcopyrite," (2002), Hydrometallurgy 64, pp. 81-88, Elsevier Science B.V.

\* cited by examiner
† cited by third party

LEACHING PROCESS FOR COPPER CONCENTRATES WITH A CARBON CATALYST

TECHNICAL FIELD

The invention pertains to a hydrometallurgical chemical leaching process for the extraction of copper from concentrates containing copper arsenic sulfosalt and copper antimony sulfosalt minerals, using a carbon catalyst.

BACKGROUND

Copper sulfides containing arsenic or antimony are commonly-occurring minerals. Arsenic-containing copper sulfides include sulpharsenites, such as enargite ($Cu_3AsS_4$), and sulpharsenates, such as tennantite ($Cu_{12}As_4S_{13}$). Antimony-containing copper sulfides include sulfantimonites, such as famatinite ($Cu_3SbS_4$), and sulphantimonates, such as tetrahedrite ($Cu_{12}Sb_4S_{13}$). It is difficult to recover the copper from such minerals. For example enargite has proven resistant to virtually every leaching process other than total pressure oxidation in autoclaves with oxygen at temperatures exceeding 200° C., which is not an economic process. Additionally, submitting enargite-containing copper concentrates to smelters for toll treatment incurs heavy financial penalties due to the high arsenic levels, when they are accepted at all.

There are two different approaches to leaching copper from concentrate, namely, bioleaching and chemical leaching. The distinction between bioleaching and chemical leaching is well established in the copper leaching art.

Bioleaching relies on the presence of bacteria or other microorganisms to enable the recovery of copper. Typically, bioleaching requires a slurry containing carbon dioxide and other microbial nutrients, sulfide concentrate and microorganisms as well as innoculant tanks, microbial monitoring systems, and control of acidity, pH and redox potential. Bioleaching of copper concentrates is typically very slow, with incomplete recoveries achieved even after many weeks to months of leaching.

Chemical leaching relies solely on a chemical interaction between minerals and does not require microorganisms. Chen, U.S. Pat. No. 3,930,969, discloses a process whereby enargite is anodically dissolved in an electrolytic cell containing a chloride solution with activated carbon added to the concentrate slurry. Approximately 28% of the copper was recovered.

It would be desirable to be able to recover copper from mineral concentrates containing copper arsenic sulfosalt and copper antimony sulfosalt minerals by an economically viable, hydrometallurgical chemical leaching process.

SUMMARY OF THE INVENTION

The invention provides a hydrometallurgical method for extracting copper from copper concentrates containing copper arsenic sulfosalt and/or copper antimony sulfosalt minerals by a chemical leaching process which uses carbon as a catalyst for the leaching reaction. The concentrate and carbon are added in particulate form to an acidic sulfate leach solution. Copper is chemically leached from the concentrate in the leach solution in the presence of an oxygen-containing gas to produce a solution containing copper ions. The leached copper is then recovered from the solution.

In one embodiment of the invention, the carbon:copper sulfide weight ratio of the carbon to the copper sulfide present in the concentrate is at least 1:20, or alternatively at least 1:9, or alternatively in the range of 1:5 to 20:1, or alternatively in the range of 1:2 to 4:1.

According to another embodiment, the carbon is maintained at a concentration in the leach solution of at least 5 grams per liter, or alternatively at least 10 grams per liter, or alternatively at least 20 grams per liter, or alternatively at some higher concentration.

According to one embodiment, the leaching is done under conditions whereby the operating potential of the leach solution is at least 390 mV versus Ag/AgCl, or alternatively at least 450 mV, or alternatively at least 470 mV, or alternatively at least 480 mV. Pyrite may be present in the copper sulfide concentrate, and, in such case, the leaching is done under conditions whereby the pyrite is not significantly oxidized, for example by maintaining the operating potential of the leach solution at less than 600 mV.

These and other features of the invention will be apparent from the following description and drawings of the preferred embodiments.

BRIEF DESCRIPTION OF THE DRAWINGS

FIG. 3 shows the effect of carbon addition and concentrate regrinding.
FIG. 4 shows the effect of carbon recycle.
FIG. 5 shows the effect of redox potential.
FIG. 6 shows the effect of different carbon mass additions.
FIG. 7 shows the effect of impeller speed.

DETAILED DESCRIPTION OF THE PREFERRED EMBODIMENTS

The Leaching Reaction

Figure 1:
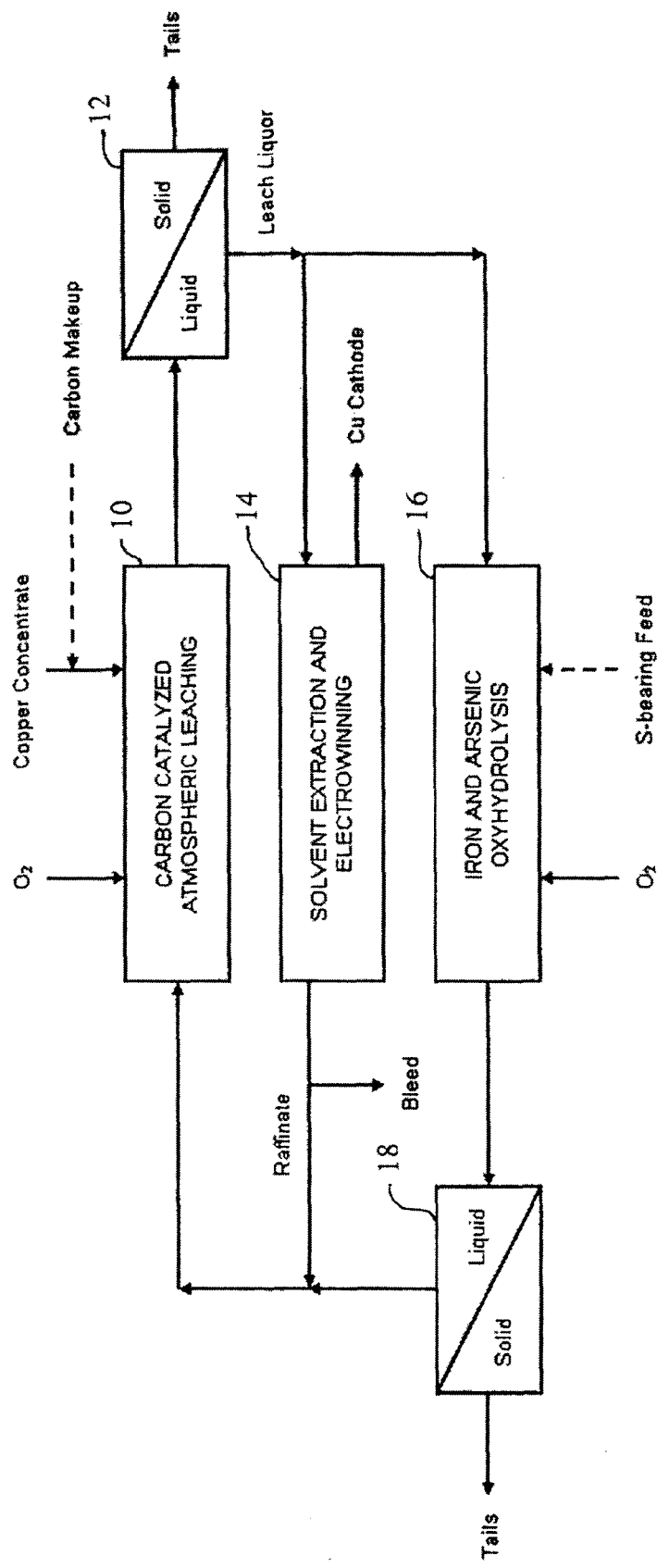
FIG. 1 is a process flowsheet for carbon-catalyzed atmospheric chemical leaching of copper concentrates, involving the steps of leaching (with internal carbon recycle), copper recovery (by SX-EW) and iron and arsenic rejection and makeup acid generation (by oxyhydrolysis).

The process of the invention is described below in respect of the recovery of the copper from enargite, as an example of the copper sulfide minerals to which the process can be applied.

In one embodiment of the copper-recovery method, particulate enargite concentrate and particulate carbon are added to an acidic ferric sulfate leach solution. The weight ratio of the carbon to the enargite present in the enargite concentrate is at least 1:20. The copper is leached in the presence of an oxygen-containing gas, for example air or $O_2$ gas, producing a solution containing copper ions. The leached copper is then recovered from the solution.

Alternatively, rather than directly controlling the weight ratio of carbon to enargite being added to the leach solution, the method may include the step of maintaining the carbon in the leach solution at a suitable concentration, by adding coarse or granular carbon to each leaching vessel and retaining most of this carbon within the vessel, for example with the use of screens. In this way, the ground concentrate slurry passes easily from tank to tank, while the carbon is retained within the tank. A certain amount of attrition of the carbon occurs and this carbon is made up by the addition of fresh carbon. In this embodiment of the method, enargite concentrate and carbon are added to an acidic sulfate leach solution. The copper is leached from the concentrate, in the presence of an oxygen-containing gas, while maintaining the carbon at a concentration of at least 5 grams per liter of the leach solution, alternatively at least 10 grams per liter, or alternatively at least 20 grams per liter.

The carbon catalyst used in the leach step may comprise one or more of activated carbon, coal, brown coal, coke, hard carbon derived from coconut shells or elemental carbon, and mixtures thereof.

Carbon does not typically occur with primary copper ores and is added to the leach reaction. The carbon may be recycled via a carbon recycle stream and reused within the system. In some embodiments of the process, coarse, hard carbon (e.g. coarse activated carbon derived from coconut shells) is used, which may be retained in the leaching reactors with screens.

In order for the leaching process to proceed at an adequate rate the operating solution potential (i.e. the potential at which the process is carried out) is maintained at at least about 390 mV versus Ag/AgCl (all solution potentials stated herein are expressed in relation to the standard Ag/AgCl reference electrode). Alternatively, the operating solution potential is at least 450 mV, or alternatively at least 470 mV, or alternatively at least 480 mV.

This control of the operating potential may be achieved by means of controlling the oxygen flow rate, or the intensity of agitation of the leaching solution, or the pulp density level. Increasing the oxygen flow rate increases the supply of oxygen, and hence increases the maximum rate at which oxygen can be taken up by the leaching reactions. Increasing the rate of agitation increases the surface area of the gas-liquid interface, which also increases the maximum uptake of oxygen. In the absence of other factors, either of these will increase the redox potential. Increasing the pulp density increases the demand for oxygen, which will cause the potential to decrease in the absence of other factors. Typically, pulp density and agitation rate are fixed at constant values by design of the leaching apparatus, and potential is controlled by means of the oxygen flow rate.

The process may be carried out on a batch basis or as a continuous process, the latter being preferred. In batch mode, as the level of enargite in the leaching reactor (and, concurrently, the demand for oxidant) diminishes with time, it may be necessary to regulate the flow of oxygen to the reactor, particularly when pure oxygen gas is used rather than air. Alternatively, in a continuous process consisting of a number of leaching tanks in series, one simply supplies oxygen to each tank at the appropriate rate. This may be facilitated in practice by supplying pure oxygen or oxygen-enriched air to the first one or two tanks and air to the remaining tanks, or running the final tank without oxygen.

Also, it is desirable that the leach solution have an initial iron level of at least 1 gram per liter to initiate the leaching process. Preferably the iron level is maintained above about 5 grams per liter or alternatively above about 10 grams per liter. This iron may be derived from iron sources in the ore, for example pyrite or chalcopyrite.

An example of a process flowsheet for carrying out the process on a continuous basis, and recovering the extracted copper, is shown in FIG. 1. The process involves three basic steps, namely, leaching 10, copper recovery (by SX-EW) 14, and iron and arsenic rejection and optional makeup acid generation (by oxyhydrolysis) 16. Optional flow streams are indicated in the figure in dotted lines. In the leach reactor, copper is leached selectively at low potential in the presence of the carbon catalyst, producing a solid sulfur residue, while ferrous is oxidized to ferric with dissolved oxygen gas:

Leaching:

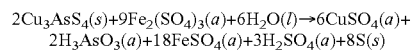

$$2Cu_3AsS_4(s)+9Fe_2(SO_4)_3(a)+6H_2O(l)\rightarrow 6CuSO_4(a)+2H_3AsO_3(a)+18FeSO_4(a)+3H_2SO_4(a)+8S(s)$$

Ferrous Oxidation:

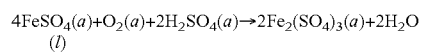

$$4FeSO_4(a)+O_2(a)+2H_2SO_4(a)\rightarrow 2Fe_2(SO_4)_3(a)+2H_2O(l)$$

Overall:

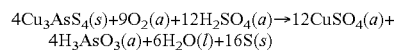

$$4Cu_3AsS_4(s)+9O_2(a)+12H_2SO_4(a)\rightarrow 12CuSO_4(a)+4H_3AsO_3(a)+6H_2O(l)+16S(s)$$

In the process shown in FIG. 1, a bulk concentrate containing a carbon:enargite ratio of at least 1:20 is subjected to the leaching process. Alternatively, the carbon:enargite ratio is at least 1:9, or between about 1:5 and 20:1, or between about 1:2 and 4:1. Carbon is added from an external source or is recycled to make up the desired ratio in the bulk concentrate. Other copper or base metal sulfides may also be present in the concentrate being leached. Pyrite may also be present or may optionally be added from an external source. It is believed that additional pyrite increases the rate of reaction and also constitutes an important source of iron in the absence of other iron sources.

The leaching process is done under agitation whereby the solution is agitated sufficiently to suspend the particulate concentrate and particulate carbon.

The leaching process is run at temperatures between about 50° C. and the melting point of sulfur (about 110 to 120° C.). Alternatively, it is run at a temperature of between about 70° C. and the melting point of sulfur, or alternatively, at a temperature of between about 80° C. and the melting point of sulfur. The leaching process can be run under any pressure between about atmospheric pressure and those pressures attainable in an autoclave. Preferably, it is run under about atmospheric pressure.

The leaching process is run under an atmosphere of oxygen-containing gas such as air, oxygen-enriched air, substantially pure oxygen, or any combination thereof, in a series of leaching tanks. Given the relatively modest oxygen requirements of the process, this oxygen gas can also be supplied by a low-cost vapor pressure swing absorption (VPSA) plant, or by a more conventional cryogenic oxygen plant for larger applications.

Ultrafine grinding of the concentrate and/or the carbon is not necessary, although the process will work with ultrafine materials. In this specification, the term P80 denotes the particle size at which 80% of the mass of material will pass through the specified size of mesh. For use in the leaching process, the P80 particle size of the enargite concentrate can vary over a wide range. For example, a P80 particle size of about 210 microns can be used. The enargite particle size may be below about 106 microns, or alternatively below about 75 microns, or alternatively below about 38 microns. Alternatively the P80 particle size of the enargite concentrate may be in the range of 38 to 106 microns.

The leach can be run at any pulp density that will seem reasonable to one skilled in the art. Higher pulp densities facilitate the control of solution potential by ensuring high ferric demand, and may also enhance the effectiveness of the carbon and enargite interaction.

According to the overall leach stoichiometry given above, at least one mole of sulfuric acid should theoretically be added to the leach for every mole of copper recovered from enargite. In practice, however, the acid requirement may fluctuate depending on the exact composition of the concentrate and the degrees of pyrite, sulfur and ferrous oxidation, and iron precipitation that occur during the leach.

Carbon does not typically occur with primary copper ores. Hence the carbon has to be purchased and delivered to the minesite. In order for the process to be economically viable, the carbon should be efficiently recycled. In one embodiment this is accomplished by maintaining coarse carbon within each leaching reactor with screens. In this way, the ground concentrate slurry passes easily from tank to tank, while the carbon is retained within the tank. Coarse, hard carbon such as the coarse activated carbon derived from coconut shells can be used in this embodiment. A certain amount of attrition of the carbon occurs, particularly given the requirement for high-shear mixing to ensure adequate gas-liquid mixing. Hence, in this scenario, a certain amount of carbon passes through the screens and is lost to the tailings, and this carbon has to be made up by addition of fresh carbon.

The carbon particle size may be coarse as in commercially-available activated carbon, or alternatively the carbon may be finely ground. A smaller carbon particle size may be used to obtain a larger surface area on the carbon. A larger particle size may be used to enable retention and recycling in the leaching vessels with screens and provide a more economically viable process.

Solid-Liquid Separation and Solvent Extraction

Following the leaching process, copper can be extracted from the leach solution. After a solid-liquid separation (step 12 in FIG. 1), producing a liquid solution containing the copper, the liquid solution is subjected to conventional solvent extraction (SX) and electrowinning (EW) 14 to produce pure copper cathodes according to the following overall reaction:

SX-EW:

$$CuSO_4(aq)+H_2O(l)\rightarrow Cu(s)+H_2SO_4(aq)+\tfrac{1}{2}O_2(g)$$

Oxyhydrolysis

In order to reject iron and to recover the remainder of the acid, a raffinate bleed stream is subjected to oxyhydrolysis 16 with oxygen gas to oxidize ferrous to ferric and form a stable ferric precipitate. One preferred method involves the formation of hematite thus:

Iron Oxyhydrolysis:

$$FeSO_4(aq)+\tfrac{1}{4}O_2(g)+H_2O(l)\rightarrow \tfrac{1}{2}Fe_2O_3(s)+H_2SO_4(aq)$$

This process involves a small amount of oxygen gas. The hematite can simply pass through the leach circuit and be rejected to the tails. Alternatively, a separate solid-liquid separation 18 can be inserted between the oxyhydrolysis reactor and the atmospheric leach circuit to remove hematite. The steady state concentration of dissolved iron entering the leach circuit is inversely related to the proportion of raffinate bled to oxyhydrolysis.

Trivalent arsenic in the leach solution is oxidized to the pentavalent state by ferric and precipitated as ferric arsenate, $FeAsO_4$ (scorodite) during the oxyhydrolysis step:

Arsenic Oxyhydrolysis:

$$4H_3AsO_3(a)+4FeSO_4(a)+3O_2(a)\rightarrow 4FeAsO_4(s)+4H_2SO_4(a)+2H_2O(l)$$

Scorodite is a stable compound which can be safely discharged to a tailings impoundment.

In the event that the concentrate does not contain sufficient iron to precipitate all the arsenic as scorodite, a source of iron may be added, for example pyrite, to bring the molar ratio of iron:arsenic to 1:1 or greater, alternatively at least 1.4:1.

Overall Process Stoichiometry

Combining the reactions for enargite leaching, SX-EW, and arsenic hydrolysis gives the overall process stoichiometry for copper recovery from enargite:

$$4Cu_3AsS_4(s)+12O_2(a)+4H_2O(l)+4FeSO_4(a)\rightarrow 12Cu(s)+16S(s)+4FeAsO_4(s)+4H_2SO_4(a)+6O_2(g)$$

The oxygen on the left is consumed in the leach, while the oxygen on the right is produced in electrowinning. Hence, they do not cancel each other. The ferrous sulfate for arsenic oxyhydrolysis can be extracted from either chalcopyrite or pyrite in the atmospheric leach, the autoclave, or both; if the concentrate contains little chalcopyrite or pyrite, the iron is added as ferrous or ferric sulfate. For example, chalcopyrite is oxidized in the atmospheric leach to give the following stoichiometry:

$$CuFeS_2(s)+2H_2SO_4(a)+O_2(a)\rightarrow CuSO_4(a)+FeSO_4(a)+2S(s)+2H_2O(l)$$

Combining this reaction with SX-EW, one obtains the following:

$$CuFeS_2(s)+H_2SO_4(a)+O_2(a)\rightarrow Cu(s)+FeSO_4(a)+2S(s)+H_2O(l)+\tfrac{1}{2}O_2(g)$$

Combining this result with the overall enargite stoichiometry, assuming just enough iron to satisfy the demands of arsenic oxyhydrolysis (any excess will be rejected by iron oxyhydrolysis), gives the following:

$$Cu_3AsS_4(s)+CuFeS_2(s)+4O_2(a)\rightarrow 4Cu(s)+6S(s)+FeAsO_4(s)+2O_2(g)$$

Hence, the ideal molar ratio of enargite to chalcopyrite in the concentrate is 1:1. Additional enargite would require an alternative iron source, such as pyrite, for complete arsenic rejection as scorodite. Most enargite deposits are pyrite-rich. Also, when sufficient iron is present for arsenic oxyhydrolysis, the process is essentially acid neutral.

EXAMPLES

Copper was leached from high-arsenic copper concentrates in an acidic ferric sulfate leach solution in accordance with the method of the invention, using activated carbon as a leaching catalyst. The tests were done at a temperature of 80° C., a leach solution volume of 1500 mL, and using pure oxygen gas. Further conditions are described in the particular examples. The copper concentration in solution was measured at various time intervals, and the percentage of copper leached was calculated on that basis.

Example 1

A sample of enargite concentrate from Peru having the following mineralogical composition (by XRD-Reitveld analysis) was leached:

| Mineral | Ideal Formula | Mass % |
| --- | --- | --- |
| Pyrite | $FeS_2$ | 57.3 |
| Enargite | $Cu_3AsS_4$ | 22.2 |
| Quartz | $SiO_2$ | 8.6 |
| Alunite | $K_2Al_6(SO_4)_4(OH)_{12}$ | 4.0 |
| Chalcopyrite | $CuFeS_2$ | 3.9 |
| Luzonite | $Cu_3AsS_4$ | 2.9 |
| Tennantite | $(Cu,Ag,Fe,Zn)_{12}As_4S_{13}$ | 1.1 |
| Total | | 100.0 |

Figure 2:
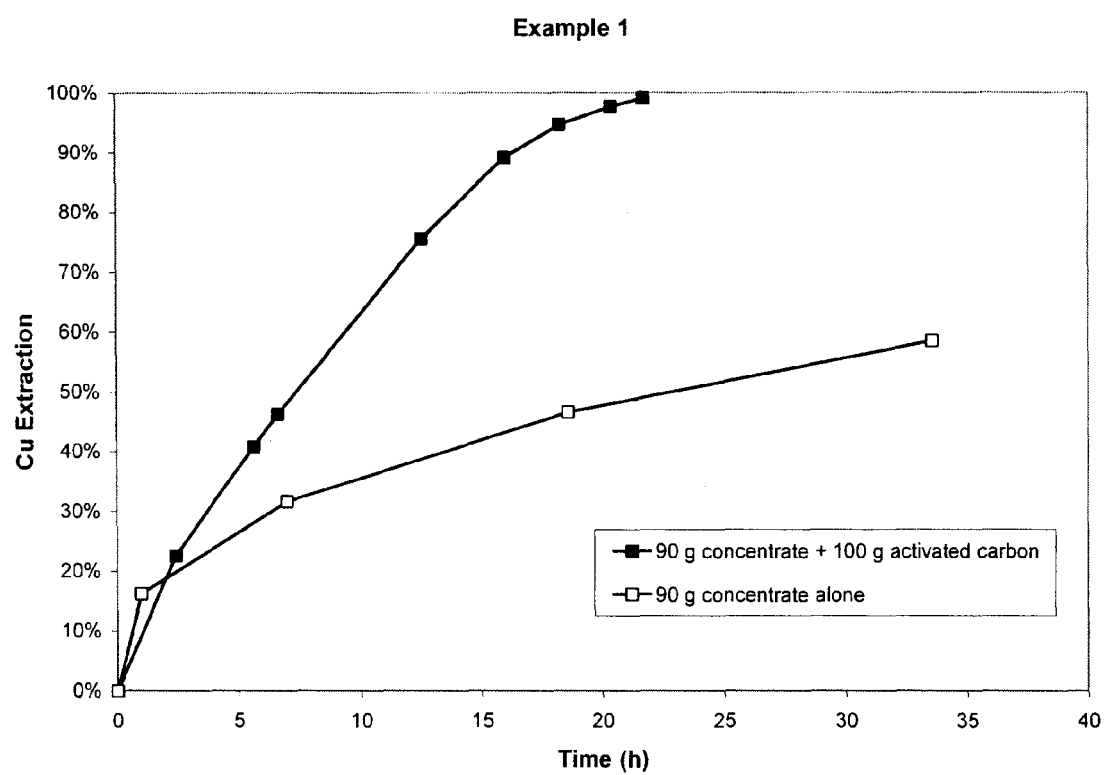
FIG. 2 is a graph of copper extraction versus reaction time, showing the effect of activated carbon addition on copper extraction from a copper concentrate containing copper arsenic sulfides in the form of enargite, luzonite and tennantite.

The operating potential was 480 mV versus Ag/AgCl. The agitation speed was 1200 rpm. The initial ferric:ferrous weight ratio was 1:3. The initial sulfuric acid content was 60 g/L. The activated carbon was Calgon (trademark) CPG LF 12×40 acid-washed granular activated carbon, with an approximate particle size of 12×40 mesh (1.68×0.42 mm). The leaching tests were done on the concentrate alone (90 g sample) as a control and with the addition of 100 g activated carbon. The weight ratio of carbon to copper arsenic sulfides (enargite+luzonite+tennanite) was accordingly 4.2:1. The results are shown in FIG. 2.

It is apparent that the addition of the activated carbon substantially enhanced the leaching, resulting in over 99% of the copper being leached in 22 hours.

Example 2

A sample of enargite concentrate from Peru having the following mineralogical composition was leached:

| Mineral | Ideal Formula | Mass % |
| --- | --- | --- |
| Pyrite | $FeS_2$ | 61.5 |
| Enargite | $Cu_3AsS_4$ | 20.4 |
| Quartz | $SiO_2$ | 7.4 |
| Chalcopyrite | $CuFeS_2$ | 3.9 |
| Alunite | $K_2Al_6(SO_4)_4(OH)_{12}$ | 3.9 |
| Luzonite (antimonian) | $Cu_3(As,Sb)S_4$ | 2.9 |
| Total | | 100.0 |

The initial weight ratio of ferric to ferrous was 1:5.7 (17 g $Fe_2(SO_4)_3 \cdot 5H_2O$=3.9 g $Fe^{3+}$; 110 g $FeSO_4 \cdot 7H_2O$=22.1 g $Fe^{2+}$). The sulfuric acid content was 80 g (53.3 g/L).

Thirteen leaching tests are reported, the concentrate and a generic activated carbon having the following characteristics. The references to "pulverized 90 s" means that the concentrate sample was processed in a ring-disk pulverizer for 90 seconds prior to leaching, while "rodmilled 20 min" means that the concentrate sample was processed in a rod mill for 20 minutes prior to leaching. In the figure legends, "C" refers to activated carbon and "cone" refers to concentrate.

Unless otherwise noted, test conditions include: concentrate pulverized 90 s, a redox potential of 490 mV versus Ag/AgCl and an impeller speed of 1200 rpm.

Test A 40 g concentrate (no additional grinding, no carbon)
Test B 40 g concentrate (no carbon)
Test C 40 g concentrate (no additional grinding)+40 g activated carbon
Test D 40 g concentrate+40 g activated carbon
Test E 40 g concentrate rodmilled 20 min+40 g activated carbon
Test F 20 g concentrate+20 g carbon recycled from Test D
Test G 40 g concentrate+40 g activated carbon at 450 mV
Test H 40 g concentrate+40 g activated carbon at 515 mV
Test I 40 g concentrate+40 g activated carbon at 530 mV
Test J 40 g concentrate+20 g activated carbon at 515 mV
Test K 40 g concentrate+10 g activated carbon at 515 mV
Test L 40 g concentrate+40 g activated carbon at 515 mV and 750 rpm
Test M 40 g concentrate+40 g activated carbon at 515 mV and 450 rpm The weight ratio of carbon to concentrate for Tests C-I and L-M was 1:1 and accordingly the weight ratio of carbon to copper arsenic/antimony sulfides (enargite+luzonite) was 4.3:1. The weight ratio of carbon to concentrate for Test J was 1:2 and accordingly the weight ratio of carbon to copper arsenic/antimony sulfides (enargite+luzonite) was 2.2:1. Finally, the weight ratio of carbon to concentrate for Test K was 1:4 and accordingly the weight ratio of carbon to copper arsenic/antimony sulfides (enargite+luzonite) was 1.1:1.

Figure 3:
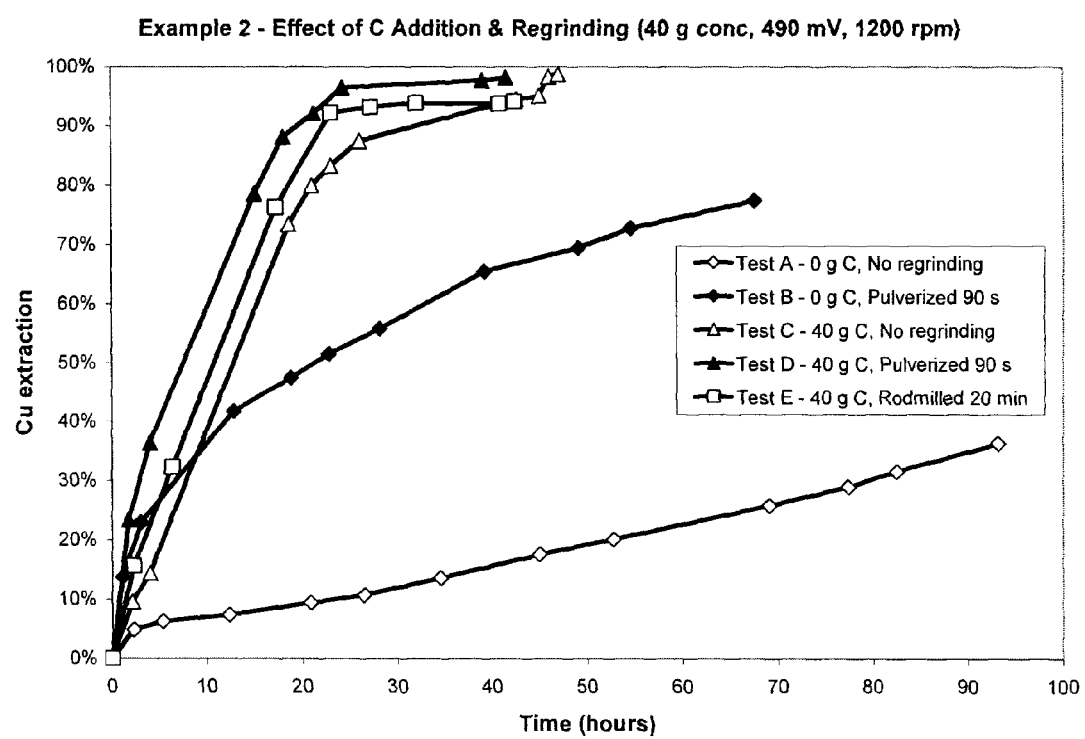
FIGS. 3, 4, 5, 6 and 7 are graphs of copper extraction versus reaction time, showing the effect of various concentrate and carbon treatments and operating conditions on copper extraction from a copper concentrate containing copper arsenic and copper antimony sulfides in the form of enargite and antimonian luzonite.

The effects of activated carbon addition and regrinding are shown in FIG. 3. In the absence of activated carbon, the degree of copper extraction was incomplete, and the leaching rate was a strong function of regrinding, with only 36% Cu extraction after 93 hours from the sample as delivered, and 77% Cu extraction after 68 hours from the pulverized sample. In the presence of activated carbon, leaching was rapid and complete after 40 hours without regrinding, and after just 24 hours with regrinding. Pulverizing and rodmilling gave similar results.

Figure 4:
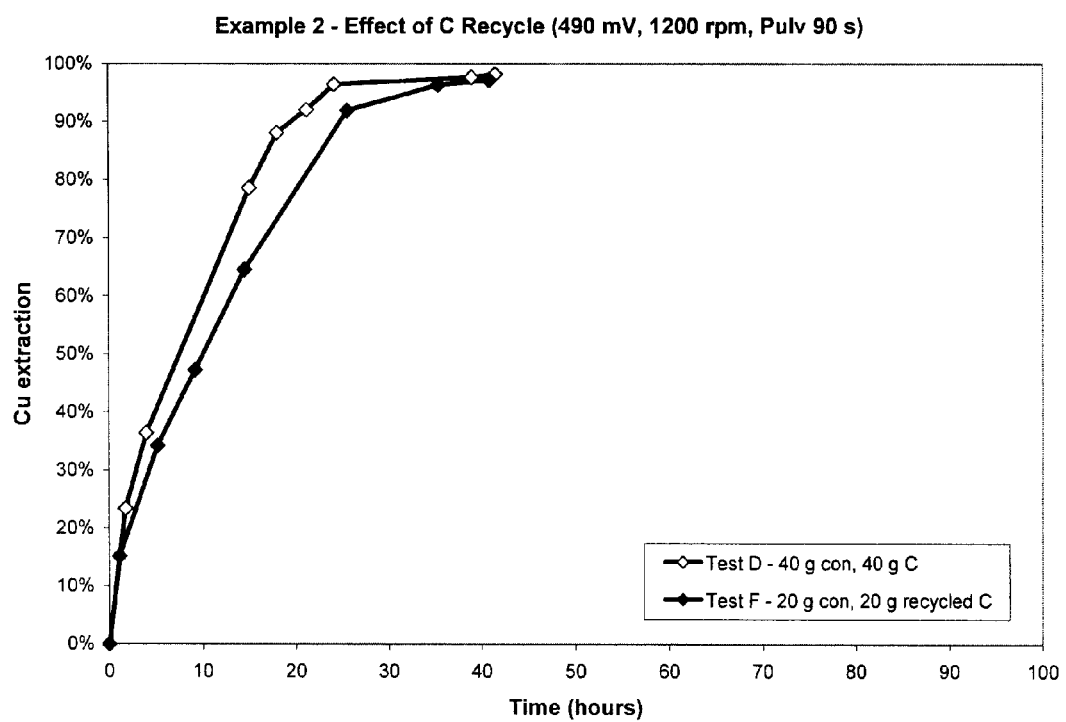

The effect of carbon recycle is shown in FIG. 4, which shows that recycled carbon was nearly as effective as fresh carbon as a catalyst for enargite leaching.

Figure 5:
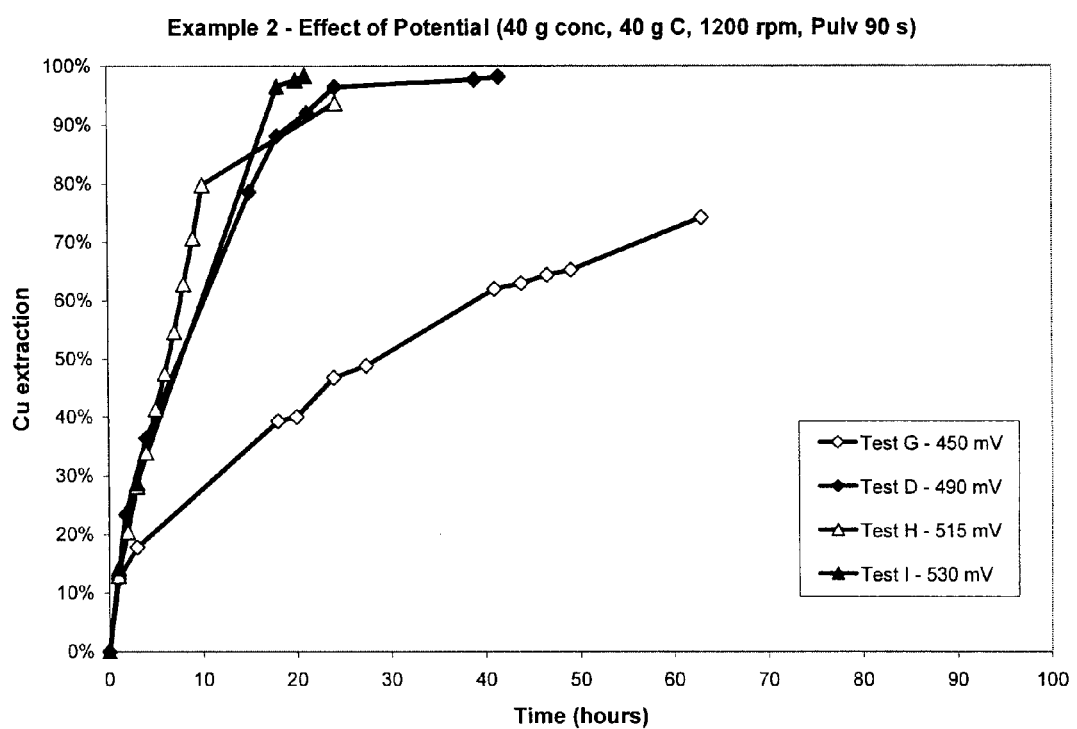

The effect of solution potential is shown in FIG. 5. At 450 mV versus Ag/AgCl, Cu extraction only reached 74% after 63 hours. However, at 490 mV and above, leaching was rapid, with complete Cu extraction within 24 hours. It bears noting that 530 mV was the maximum potential which could be maintained in these tests, presumably because the large amount of pyrite in the concentrate consumed oxidant rapidly at potentials above this level.

Figure 6:
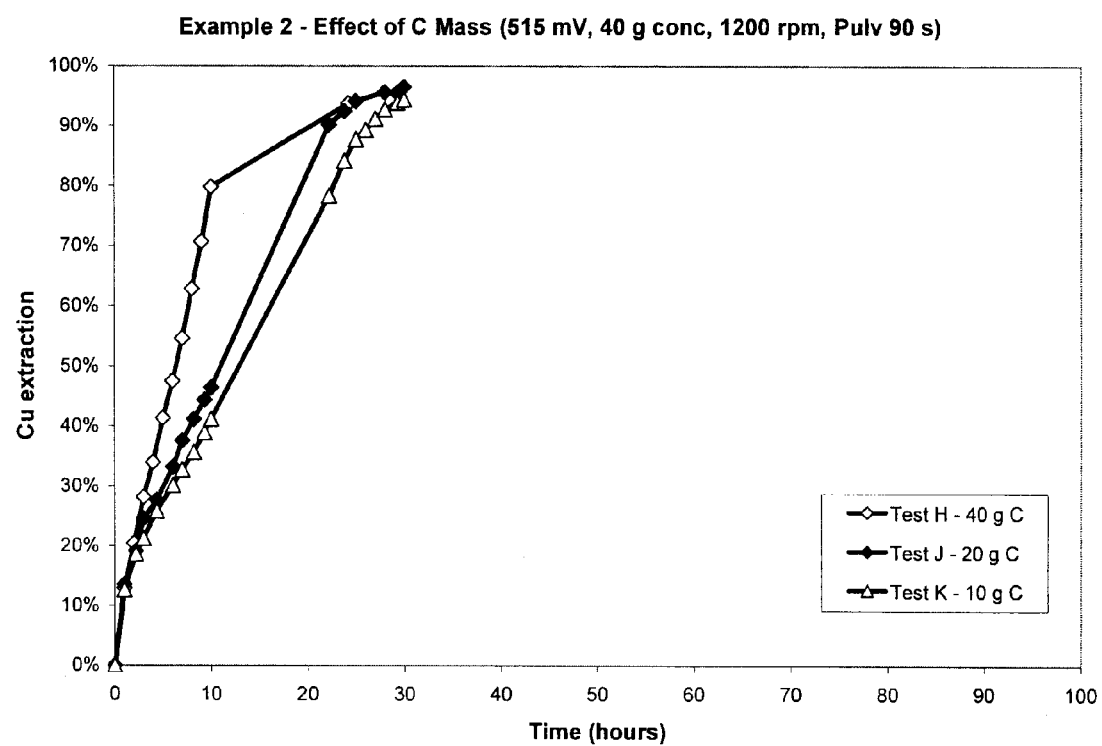

The effect of activated carbon mass addition is shown in FIG. 6. At carbon levels one half and one quarter of the baseline, leaching was still rapid, with complete Cu extraction within 30 hours.

Figure 7:
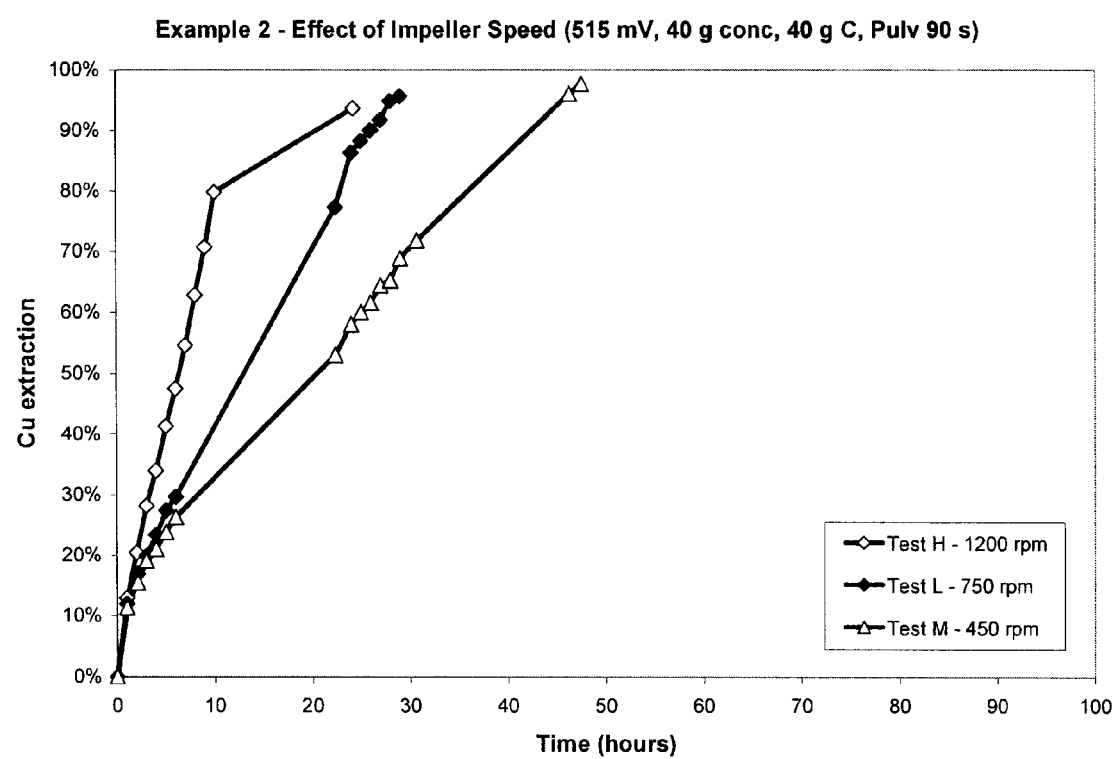

Finally, the effect of impeller speed is shown in FIG. 7. Leaching at a low impeller speed is desirable in order to minimize the loss of carbon by attrition. However, decreasing the impeller speed had a significant negative effect on the rate of leaching, although at 750 rpm complete Cu extraction was still attained within about 30 hours. It bears noting that the potential was maintained at 515 mV in all of the tests shown in the figure, so a decrease in redox potential was not the cause of the lower leaching rates. The impeller was unable to suspend the solids effectively at 450 rpm, and this is the most likely cause of the decrease in leaching kinetics. This result suggests that a low-shear, high-flow impeller may be more suitable for this application than a high-shear turbine.

Example 3

A massive enargite sample from Montana having the following mineralogical composition was leached:

| Mineral | Ideal Formula | Mass % |
| --- | --- | --- |
| Enargite | $Cu_3AsS_4$ | 62.0 |
| Pyrite | $FeS_2$ | 16.1 |
| Quartz | $SiO_2$ | 7.9 |
| Tennantite | $(Cu,Ag,Fe,Zn)_{12}As_4S_{13}$ | 6.5 |
| Bornite | $Cu_5FeS_4$ | 2.7 |

-continued

| Mineral | Ideal Formula | Mass % |
|---|---|---|
| Covellite | CuS | 2.3 |
| Sphalerite | (Zn,Fe)S | 1.3 |
| Siderite | $Fe^{2+}CO_3$ | 0.8 |
| Talc | $Mg_3Si_4O_{10}(OH)_2$ | 0.5 |
| Total | | 100.0 |

The operating potential was 485 mV. The initial weight ratio of ferric to ferrous was 1:5 (18 g $Fe_2(SO_4)_3 \cdot 5H_2O$=4.1 g $Fe^{3+}$; 102 g $FeSO_4 \cdot 7H_2O$=20.5 g $Fe^{2+}$). The sulfuric acid content was 80 g (53.3 g/L).

Six leaching tests were done, the concentrate and the activated carbon having the following characteristics:

Test 1 15 g pulverized sample (no carbon)
Test 2 15 g pulverized sample+15 g generic activated carbon
Test 3 15 g pulverized sample+15 g Norit DARCO H2S M-1621, formulated for $H_2S$ oxidation in wastewater
Test 4 15 g pulverized sample+15 g Norit GCA 830 M-1607, formulated for gold absorption in CIL circuits (hard, coconut-shell carbon)
Test 5 15 g pulverized sample+15 g Norit GCA 612 M-1617, formulated for gold absorption in CIL circuits (hard, coconut-shell carbon)
Test 6 15 g pulverized sample+15 g Calgon 12×20, formulated for general water purification applications (soft, activated charcoal)

Figure 8:
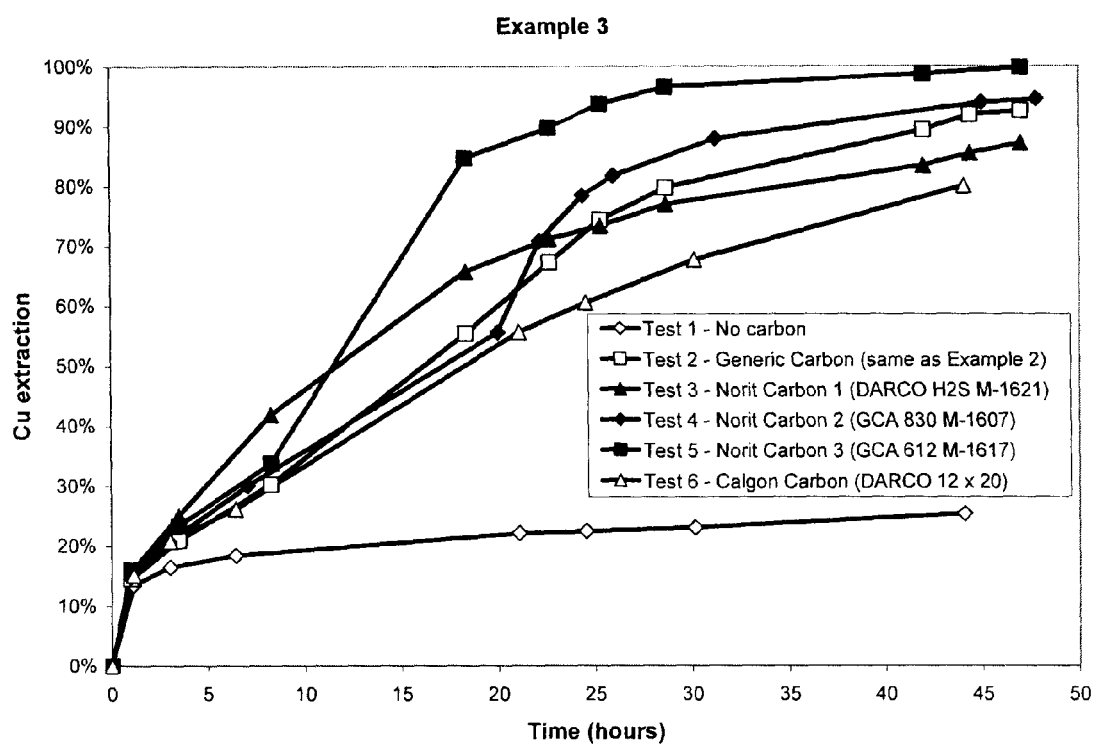
FIG. 8 is a graph of copper extraction versus reaction time for a further sample of enargite, showing the effect of various activated carbon catalysts.

The weight ratio of carbon to concentrate for Tests 2-6 was 1:1 and accordingly the weight ratio of carbon to copper arsenic sulfides (enargite+tennantite) was 1.46:1. The results are shown in FIG. 8.

The test results show that with lower pyrite concentrate than in the Peru concentrates of Examples 1 and 2, the leaching is slower, suggesting that pyrite and activated carbon may be working together in the Peru concentrate tests. It is also noted that the coconut shell carbon is a superior catalyst to the other activated carbons used, possibly because it maintains its integrity better under agitation.

The invention claimed is:

1. A method of recovering copper from a copper sulfide concentrate comprising one of a copper arsenic sulfosalt and a copper antimony sulfosalt, comprising the steps of:
   (a) adding the concentrate and coarse carbon to an acidic sulfate leach solution, the concentrate and the coarse carbon being in particulate form, wherein the coarse carbon has a mesh size at least as large as 40 mesh;
   (b) leaching the copper from the concentrate in the leach solution, with an oxygen-containing gas, while maintaining a selected operating potential of the leach solution, to produce a solution containing copper ions; and
   (c) recovering the leached copper from the solution.

2. A method according to claim 1, wherein adding the concentrate and coarse carbon to the acidic sulfate leach solution comprises adding the concentrate and coarse carbon in a weight ratio of at least 1:1 of coarse carbon to copper sulfide.

3. A method according to claim 2, wherein the copper sulfide concentrate comprises a copper arsenic sulfosalt selected from one of a sulpharsenite and a sulpharsenate.

4. A method according to claim 2, wherein the copper sulfide concentrate comprises enargite.

5. A method according to claim 4, wherein the selected operating potential is at least 390 mV versus Ag/AgCl.

6. A method according to claim 4, wherein the selected operating potential is at least 450 mV versus Ag/AgCl.

7. A method according to claim 4, wherein the selected operating potential is at least 470 mV versus Ag/AgCl.

8. A method according to claim 4, wherein the selected operating potential is at least 480 mV versus Ag/AgCl.

9. A method according to claim 4, wherein the concentrate further comprises pyrite, and wherein the selected operating potential is less than 600 mV versus Ag/AgCl.

10. A method according to claim 4, wherein the maintaining is done by controlling oxygen flow rate.

11. A method according to claim 4, wherein the maintaining is done by controlling intensity of agitation of the leach solution.

12. A method according to claim 4, wherein the maintaining is done by controlling pulp density level.

13. A method according to claim 4, wherein the maintaining is done by controlling one or more of oxygen flow rate, intensity of agitation of the leach solution or pulp density level, or any combinations thereof.

14. A method according to claim 4, further comprising, in step (b), agitating the leach solution to suspend the concentrate and coarse carbon in the leach solution.

15. A method according to claim 4, wherein the coarse carbon:copper sulfide weight ratio is in the range of 1:1 to 20:1.

16. A method according to claim 4, wherein the coarse carbon:copper sulfide weight ratio is in the range of 1:1 to 4:1.

17. A method according to claim 4, wherein the coarse carbon is maintained at a concentration in the leach solution of at least 5 g/L.

18. A method according to claim 4, wherein the coarse carbon is maintained at a concentration in the leach solution of at least 10 g/L.

19. A method according to claim 4, wherein the coarse carbon is maintained at a concentration in the leach solution of at least 20 g/L.

20. A method according to claim 4, wherein at least some of the coarse carbon is recycled for use in the leaching step.

21. A method according to claim 20, wherein the recycling is done by retaining with a screen at least some of the coarse carbon in a leaching reactor in which the leaching is done.

22. A method according to claim 4, wherein the concentrate and the coarse carbon are added in the form of a mixture.

23. A method according to claim 4, further comprising adding particulate pyrite to the leach solution.

24. A method according to claim 4, wherein the leaching step is carried out at atmospheric pressure.

25. A method according to claim 4, wherein the leaching step is carried out above atmospheric pressure.

26. A method according to claim 4, wherein the step of recovering leached copper comprises solvent extraction and electrowinning.

27. A method according to claim 26, wherein ferrous ions in a raffinate stream from the solvent extraction step are oxidized to ferric ions by oxygen gas and precipitated as a stable ferric precipitate.

28. A method according to claim 26, wherein arsenite ions in a raffinate stream from the solvent extraction step are oxidized to arsenate ions with dissolved iron and precipitated as a stable ferric arsenate precipitate.

29. A method according to claim 4, wherein the coarse carbon comprises activated carbon, coal, brown coal, coke, hard carbon derived from coconut shells, elemental carbon, or mixtures thereof.

30. A method according claim 4, wherein the copper sulfide concentrate comprises a copper antimony sulfosalt selected from one of a sulfantimonite and a sulphantimonate.

31. A method according to claim 2, wherein the copper sulfide concentrate comprises tennantite.

32. A method of recovering copper from a copper sulfide concentrate comprising one of a copper arsenic sulfosalt and a copper antimony sulfosalt, comprising the steps of:
   (a) adding the concentrate and coarse carbon to an acidic sulfate leach solution, the concentrate and the coarse carbon being in particulate form, wherein the coarse carbon has a mesh size at least as large as 40 mesh;
   (b) leaching the copper from the concentrate in the leach solution, with an oxygen-containing gas, to produce a solution containing copper ions; and
   (c) recovering the leached copper from the solution.

33. A method according to claim 32, wherein the copper sulfide concentrate comprises enargite.

34. A method according to claim 33, wherein the coarse carbon and the concentrate are added to the leach solution in a weight ratio of at least 1:20 of coarse carbon to copper sulfide.

35. A method according to claim 33, wherein the coarse carbon is maintained at a concentration in the leach solution of at least 5 g/L.

36. A method according to claim 33, wherein at least some of the coarse carbon is recycled for use in the leaching step.

37. A method according to claim 33, wherein the leaching step is carried out at atmospheric pressure.

38. A method according to claim 33, wherein the coarse carbon and the concentrate are added to the leach solution in a weight ratio of at least 1:1 of coarse carbon to copper sulfide.

39. A method according to claim 33, further comprising maintaining a selected operating potential of the leach solution of at least 390 mV versus Ag/AgCl during the leaching.

40. A method according to claim 39, wherein the concentrate further comprises pyrite, and wherein the selected operating potential is less than 600 mV versus Ag/AgCl.

41. A method according to claim 39, wherein the maintaining is done by controlling one or more of oxygen flow rate, intensity of agitation of the leach solution or pulp density level, or any combinations thereof.

42. A method according to claim 39, wherein the coarse carbon and the concentrate are added to the leach solution in a weight ratio of at least 1:20 of coarse carbon to copper sulfide, and wherein the leaching step is carried out at atmospheric pressure.

* * * * *